United States Patent [19]

Akagi

[11] Patent Number: 4,604,691
[45] Date of Patent: Aug. 5, 1986

[54] DATA PROCESSING SYSTEM HAVING BRANCH INSTRUCTION PREFETCHING PERFORMANCE

[75] Inventor: Masanobu Akagi, Tokyo, Japan

[73] Assignee: Nippon Electric Co., Ltd., Tokyo, Japan

[21] Appl. No.: 415,709

[22] Filed: Sep. 7, 1982

[51] Int. Cl.⁴ .............................................. G06F 9/42
[52] U.S. Cl. ................................................... 364/200
[58] Field of Search ................................ 364/200, 900

[56] References Cited

U.S. PATENT DOCUMENTS

| | | | |
|---|---|---|---|
| 3,723,976 | 3/1973 | Alvarez et al. | 364/200 |
| 3,872,447 | 3/1982 | Tessera et al. | 364/200 |
| 3,991,404 | 11/1976 | Brioschi et al. | 364/200 |
| 4,200,927 | 4/1982 | Hughes et al. | 364/200 |
| 4,370,711 | 1/1983 | Smith | 364/200 |
| 4,435,756 | 3/1984 | Potash | 364/200 |
| 4,477,872 | 10/1984 | Losq et al. | 364/200 |

OTHER PUBLICATIONS

Bloch, E. and Galage, D. I.; "Component Progress: Its Effect on High Speed Computer Architecture and Machine Organization", High Speed Computer and Algorithm Organization, Academic Press, pp. 13–39, 1977.

Primary Examiner—Gareth D. Shaw
Assistant Examiner—Daniel K. Dorsey
Attorney, Agent, or Firm—Blakely, Sokoloff, Taylor & Zafman

[57] ABSTRACT

In a data processing system there are provided a main memory device for storing information, a plurality of buffer memory devices including a plurality of blocks for storing a copy of information stored in the main memory device, an arithmetic operation controller including at least one block corresponding to at least one of the blocks of the buffer memory devices for executing instructions including a branch instruction, a branch direction control memory device for storing branch direction information obtained by executing the branch instruction and a preceding controller. The preceding controller comprises a read out means for reading out from the buffer memory devices branch direction information together with a prefetched instruction predicting means for predicting whether a branching will be successful or not.

7 Claims, 7 Drawing Figures

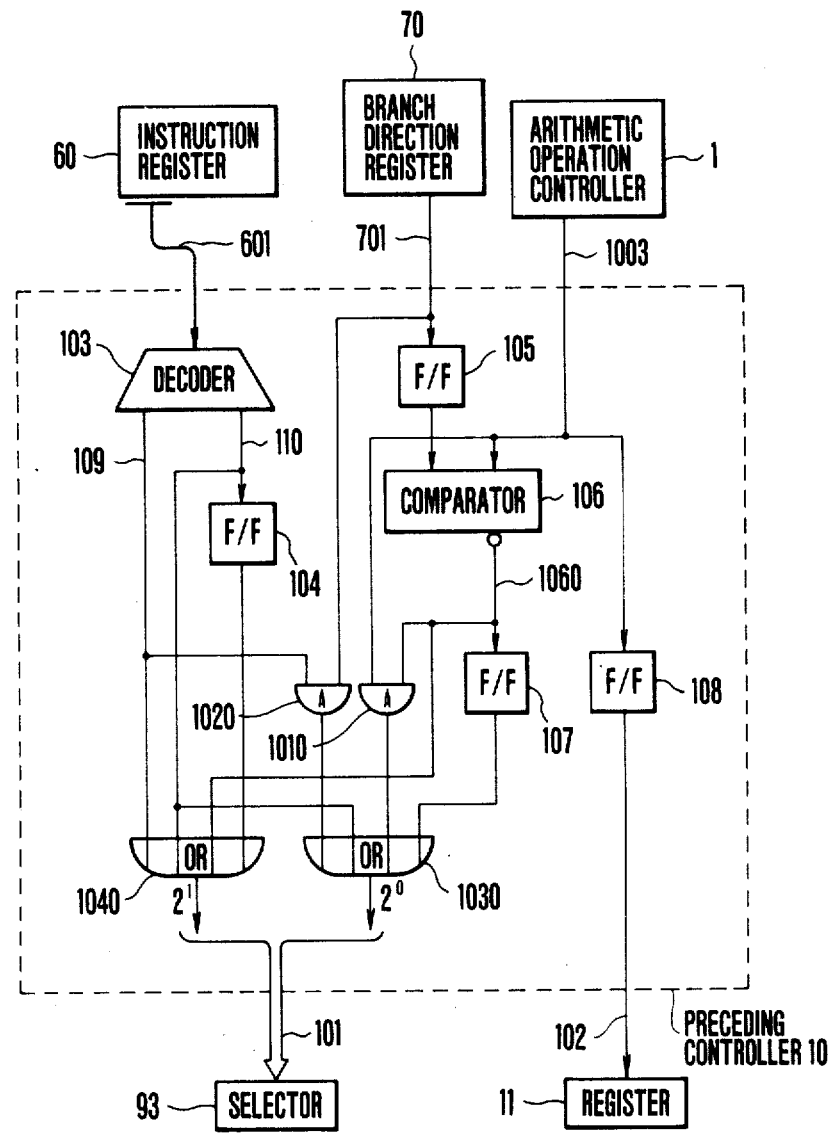
F I G.2

4,604,691

DATA PROCESSING SYSTEM HAVING BRANCH INSTRUCTION PREFETCHING PERFORMANCE

BACKGROUND OF THE INVENTION

This invention relates to a data processing system, and more particularly an improvement of a branch instruction prefetching processing executed where a judging step is included in the steps of processing an instruction sequence.

Suppose now that a group of instructions including one or more branch instructions forms an instruction sequence stored in a memory device. When executing such an instruction sequence, prior to the execution of a branch instruction, an instruction stored in an address of the memory device designated by an address to which the branching is to be made, and an instruction following the branch instruction are prefetched and after executing the branch instruction, an instruction to be executed next to an instruction which became evident as a result of executing the branch instruction is used to actuate a processor. Such a system is disclosed in U.S. Pat. No. 4,200,927, dated Apr. 29, 1980. This system is constructed such that even when two branch instructions serially included in the instruction sequence are executed, the prefetching of these two instructions is possible. More particularly where a branch instruction which transfers control in one of two directions appears twice during the prefetching operation, for the purpose of executing instruction sequences in three directions, that is an instruction sequence already executed, an instruction sequence of the two branch sequences which were branched in the success side according to the first branch instruction, and an instruction sequence branched in the success side in accordance with the second branching operation, the system is constructed such that the instructions in the three sequences can be prefetched and stored in three independent instruction buffers. With this construction, however, since prefetchings are performed in three directions, as the number of times of accessing to the memory device increases, the processing speed of the system decreases. Also as shown in U.S. Pat. No. 3,723,976, a system has been proposed to use a cache memory device for the purpose of increasing the processing speed of the system so as to prefetch from a main memory device instructions in three directions for storing the prefetched instructions. This system, however, also is required to store in the cache memory device also information not used in the main memory device during the excuting operation so that information that is used frequently would be replaced from the cache memory device to the main memory device. Consequently, the percentage of storing in the cache memory device data desired by a central processing unit (CPU) decreases, thus failing to decrease the processing speed of the system.

SUMMARY OF THE INVENTION

Accordingly, it is a principal object of this invention to provide an improved data processing system capable of executing an improved branch instruction prefetching processing.

Another object of this invention is to provide a novel data processing system capable of preventing decrease in the processing speed of the system.

Still another object of this invention is to provide a data processing system capable of branch instruction prefetching by applying the invention to a pipe line control system.

To accomplish these and other objects, according to this invention, the fact that the directions of the branch instructions contained in a given instruction program are not symmetrical is used.

More particularly, according to this invention, there is provided a data processing system having a branch instruction prefetching performance, the system comprising main memory means for storing information; buffer memory means having a plurality of blocks for holding a copy of a portion of the information stored in the main memory means in each block unit; arithmetic operation control means executing instructions including a branch instruction; branch direction control memory means including at least one block corresponding to at least one block of the buffer memory means for storing branch direction information obtained by execution of the branch instruction is a block corresponding to the block containing the branch instruction of the buffer memory means; and preceding control means including means for reading out from the branch direction control memory means branch direction information and for reading out from the buffer memory means an instruction to be prefetched, means for predicting whether a branching will be successful or not based on the branch direction information stored in the branch direction control memory means when the instruction to be prefetched is a branch instruction, and means responsive to the result of the prediction for prefetching an instruction in a direction having a highest probability of being executed succeeding to the branch instruction.

BRIEF DESCRIPTION OF THE DRAWINGS

In the accompanying drawings:

FIG. 2 is a block diagram showing a preceding controller 10 shown in FIG. 1;

DESCRIPTION OF THE PREFERRED EMBODIMENT

Figure 1:
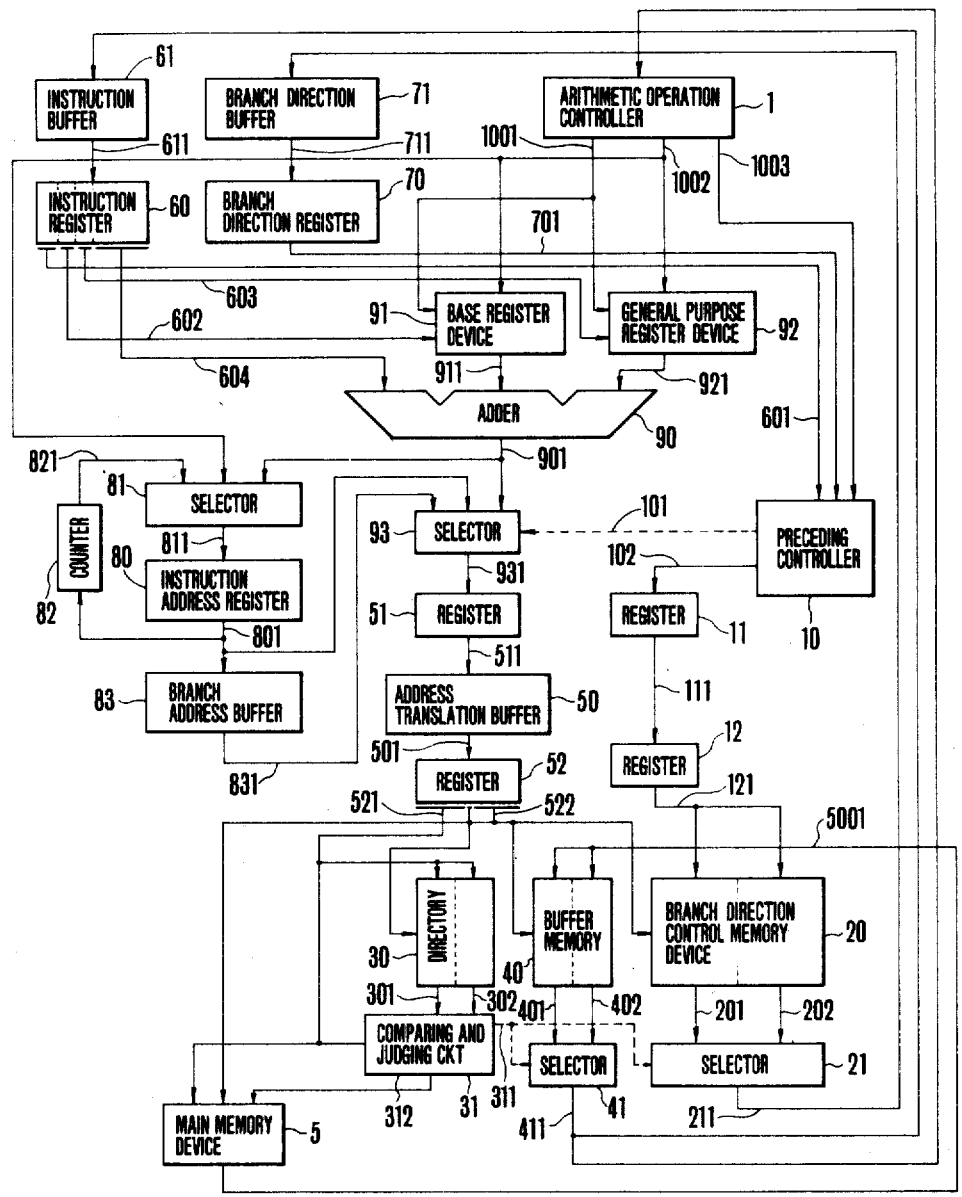
FIG. 1 is a block diagram showing a first embodiment of this invention.

FIG. 1 illustrates a first embodiment of the branch instruction prefetching system according to this invention which comprises an arithmetic operation controller 1, a main memory device 5, a preceding controller 10, registers 11 and 12, a branch direction control and memory device 20, a selector 21, a directory 30, a comparing and judging circuit 31, a buffer memory device 40, a selector 41, an address translation buffer 50, registers 51 and 52, an instruction register 60, an instruction buffer 61, a branch direction register 70, a branch direction buffer 71, an instruction address register 80, a selector 81, a counter 82, a branch address buffer 83, an adder 90, a base register device 91, a general purpose register device 92 and a selector 93.

FIG. 2 shows the detail of the preceding controller 10 which comprises a decoder 103 decoding an operation code from an instruction register 60 for applying a signal to a line 109 when the instruction is a branch instruction, but to a line 110 when the instruction is not the branch instruction; a flip-flop circuit 104 for storing the signal from the line 110 showing that the signal is not a branch instruction; a flip-flop circuit 105 storing a signal 701 from a branch direction register 70; a comparator 106 that compares a branch direction determining signal 1003 with the signal 701; a flip-flop circuit 107 that stores a signal 1060 produced when the result of comparison of the comparator 106 shows a noncoincidence; a flip-flop circuit 108 storing the signal 1003; AND gate circuits 1010, 1020 and OR gate circuits 1030, 1040. When a signal is at a logic "0" it means an unsuccessful branching, whereas at a logic "1" it means a successful branching. Further when the states of signals 1003, 102 and the flip-flop circuit 108 are "0", they show unsuccessful branching whereas when they are "1", they show successful branching. Signal 101 is a two digit binary signal. Thus, when it is "00", it indicates a not yet used state, "01" indicates a signal that selects a signal 831 from the branch address buffer 83, "10" designates selection of an instruction signal 801 from the instruction address register 80, while "11" designates selection of the result of addition 901 of adder 90.

The address translation buffer 50 is described in detail as a translation directory in U.S. Pat. No. 3,723,976.

Figure 3:
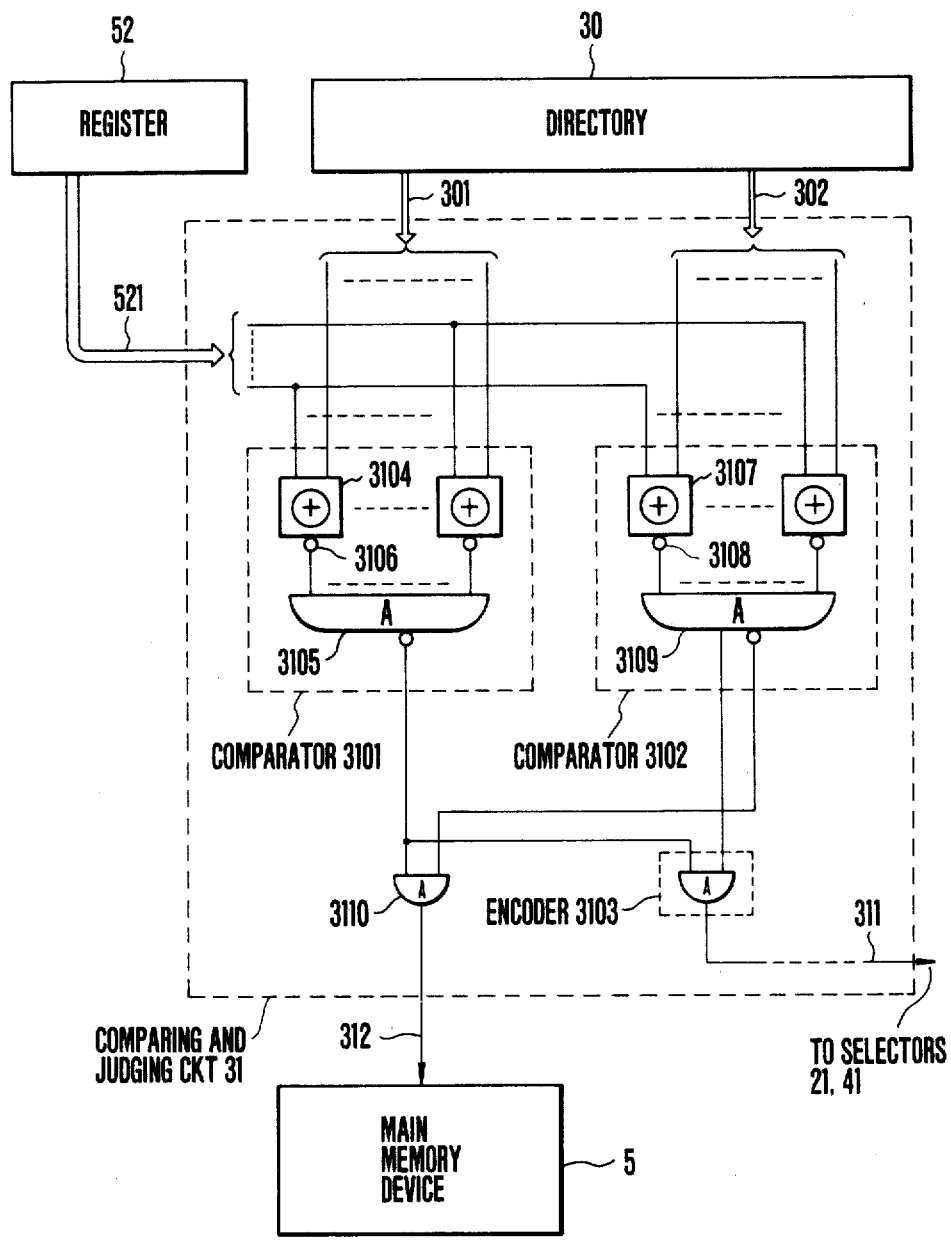
FIG. 3 is a block diagram showing the comparison and judging circuit shown in FIG. 1.

FIG. 3 shows the detail of the comparing and judging circuit 31 shown in FIG. 1. As shown, it comprises comparators 3101 and 3102 respectively comparing address informations 301 and 302 from the directory 30, an encoder 3103 which encodes based on the results of comparisons of the comparators 3101 and 3102 for outputting selection designation signals for selectors 21 and 41 shown in FIG. 1 and an AND gate circuit 3110 which obtains a logic product of the results of comparisons of the comparators 3101 and 3102 for forming an access signal 312 for the main memory device 5 when desired data is not present in the buffer memory device 40. The comparators 3101 and 3102 are respectively constituted by exclusive-OR gate circuits 3104 and 3107, inverters 3106 and 3108, and AND gate circuits 3105 and 3109.

In this embodiment, the buffer memory device 40 is constituted by two columns and the address translation buffer 50 is located in the preceeding stage of the buffer memory device 40. Since the control of the buffer memory device 40 is immaterial to this invention, its detailed description will not be made.

Figure 4:
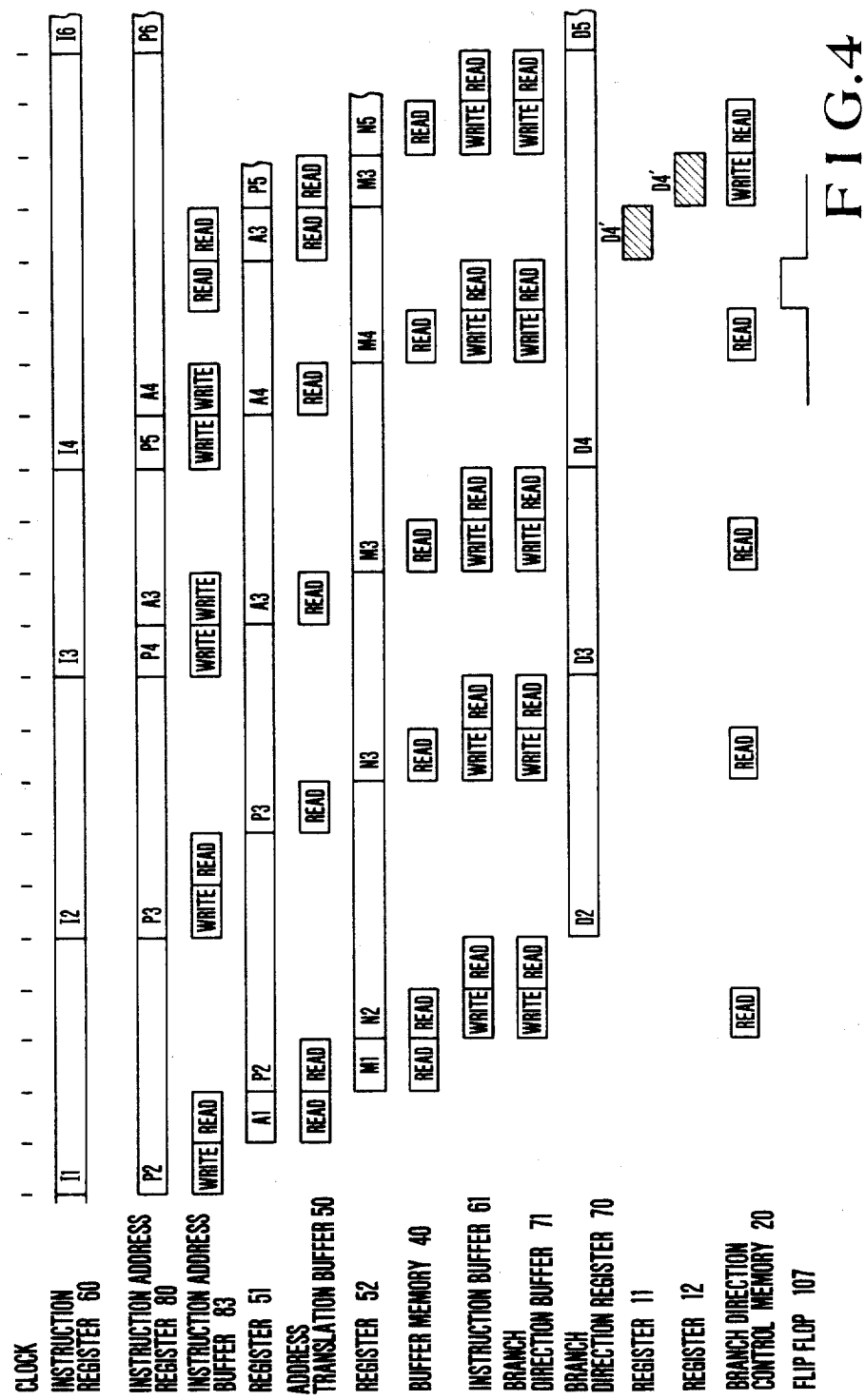
FIG. 4 is a timing chart useful to explain the operation of the first embodiment shown in FIG. 1.

The operation of this invention will now be described with reference to FIG. 4. Where an instruction code I1 in the instruction register 60 is an instruction other than a branch instruction, the preceding controller 10 produces a selection signal on line 101 that instructs the selector 93 to select an operand address A1 applied thereto from adder 90 over line 901. The operand address A1 is sent to the address translation buffer 50 via the selector 93 and register 51. The address M1 transferred by the address translation buffer 50 is stored in register 52. According to the designation of the address M1, an operand data is read out from the buffer memory device 40 and then sent to the arithmetic operation controller 1.

After an operand data has been supplied to the arithmetic operation controller 1 from the buffer memory device 40, the content of the instruction address register indicative of an instruction address P2 to be prefetched is supplied to the address translation buffer 50 via the selector 93 and the register 51. An instruction to be executed next and read out from the buffer memory device 40 according to the designation by an address signal N2 from the address translation buffer 50 is stored in the instruction buffer 61 via the instruction selector 41. At the same time, a branch direction information D2 corresponding to a block including that instruction is read out from the branch direction control memory devicer memory 20 and then stored in the branch direction buffer 71 via the selector 21. After completion of the execution of an instruction from the arithmetic operation controller 1 an instruction I2 to be executed next is taken out from the instruction buffer 61 and then stored in the instruction register 60 and the content P2 of the instruction register 80 is updated by a +2/4/6/8 counter 82 to form an address signal P3. Then, when the instruction code I2 in the instruction register 60 shows an branch instruction the preceding controller 10 performs the following controls. Namely, when the content D2 of the branch direction register 70 shows an unsuccessful branching, in other words shows that the instruction continues in the same direction as the preceding instructions, the preceding controller 10 performs the same operation except the branching operation so as to prefetch an instruction I3 to be executed next and a branch direction information D3 from the address P3 shown by the instruction address register 80. When an instruction I3 to be executed next is a branch instruction and when the content D3 of the branch direction register 70 shows a successful branching, that is the flow of the instruction is not changed, an address signal A2 calculated by the adder 90, given via a line 901 and indicative of an address toward which the branching is to be made will be applied to the address translation buffer 50 via the selector 93 and the register 51, and the address signal translated in the buffer 50 is stored in the register 52. In accordance with the designation of this address signal M3, an instruction I4 showing an address to which the branching is to be made is read out from the buffer memory device 40.

The instruction I4 read out from the buffer memory device 40 is then stored in the instruction buffer memory device 61 via the selector 41, and a branch direction information D4 corresponding to a block including the instruction I4 is read out from the branch direction control memory device 20 and then stored in the branch direction buffer 71.

More particularly, applied to the instruction register the preceding controller 10 judges whether there is a large probability of branching in the same direction as before according to the content of the branch direction register 70 showing the branch direction (successful or unsuccessful) at the time when the same instruction was executed before so as to determined whether to use either the branch address indicated by the branch instruction or the output of the adder 90 and the content of the instruction address register 80.

Furthermore, in the preceding controller 10, when a branch instruction is supplied to the instruction register 60, while an address signal indicative of the branch instruction is still remaining in the instruction address register 80, the content thereof is stored in the instruction buffer 83 as a copy thereof and held in the instruction buffer until completion of the execution of the branch instruction. When the arithmetic operation controller 1 has executed the branch instruction and the correct branch direction is determined, a branch direction correct determination signal 1003 is applied to the preceding controller 10 which checks whether a prefetched instruction stored in the instruction buffer 61 is an instruction in the same direction as the finally determined branch direction or not.

This operation will be described with reference to FIG. 2. The branch direction information of the instruction I4 prefetched in the instruction buffer 61 shown in FIG. 1 is stored in the branch direction register 70. This information is stored in the flip-flop circuit 105 via a line 701. The content of this flip-flop circuit 105 is compared with the correct branch direction determination signal given from the arithmetic operation controller 1 via line 1003 with comparator 106 so as to perform the check described above. When the result of comparison is a noncoincidence, that is when the branch directions are different, a noncoincidence signal would be stored in the flip-flop circuit 107 via line 1060.

As a result of comparison, when it was found that the branch directions are different, for the purpose of multifying the prefetched instruction I5 and of again reading out an instruction, the following operation is performed.

An address signal A3 read out from the instruction address buffer 83 is applied to the address translation buffer 50 via the register 51. In response to the address signal A3 thus applied, an address signal M3 is read out from the buffer 50 and is then applied to the register 52, and a branch direction information D4' determined by the register in response to the designation of the address signal M3 from the register 52 is written into the branch direction control memory device 20.

As above described, each time a branch instruction is executed, the results regarding the branchings are stored in the branch direction control memory device 20, and where the instruction to be prefetched is a branch instruction, according to a branch direction information read out at the time of prefetching, the prefetching of the instruction can be made only in an effective direction.

When the system of this invention is applied to a pipe line control system, for example, the probability of success of the branching amounts to 90% on the average, thus making it possible to increase the speed of processing than the prior art cache system while maintaining a high probability.

A second embodiment of this invention will be described hereunder with reference to FIGS. 5, 6 and 7 in which circuit elements identical to those shown in the previous embodiment are designated by the same reference charactors.

Figure 5:
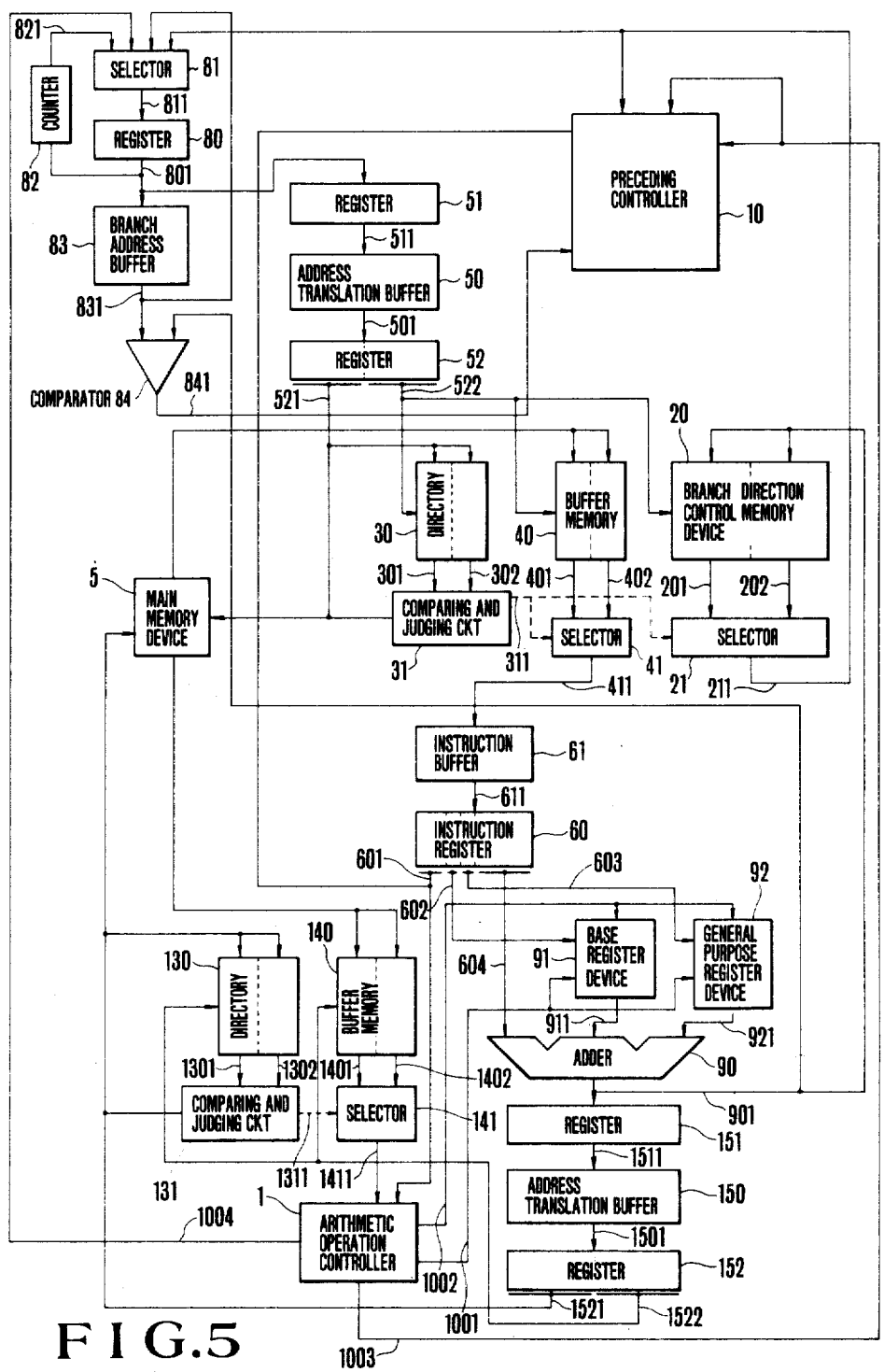
FIG. 5 is a block diagram showing a second embodiment of this invention.

The modification shown in FIG. 5 is identical to the embodiment shown in FIG. 1 except the following point. Firstly, to the first embodiment is added a comparator 84 which compares the output of the instruction address buffer 83 and the result of addition of the adder 90 sent over a line 901. Secondly, the directory 30, buffer memory 40 and address translation buffer 50 of the first embodiment are each divided for operand and instruction. Thus, there are provided two directories 30 and 130, two buffer memories 40 and 140, and two address translation buffers 50 and 150. Circuitries associated therewith 31, 131, 141, 52 and 152 are also added.

Thirdly, while in the first embodiment, the preceding controller 10 is constituted by a logic circuit, in the second embodiment, the preceding controller is constructed to perform a microinstruction control as disclosed in U.S. Pat. Nos. 3,991,404, 3,494,372 and 3,872,447.

The detail of the operation of the second embodiment will now be described. This control is effected by a microinstruction control shown in FIG. 7. As shown in FIGS. 5 and 6, before executing an instruction, an instruction is read out from the buffer memory device 40. At this time, when a desired instruction is not stored in this buffer memory device 40, such instruction is fetched from the main memory device 5 and stored in the buffer memory device 40. Concurrently therewith, an address signal of an instruction at a position next to the desired instruction in the instruction stream is provided by the adder 90 and stored in the branch direction control memory device 20.

Figure 6:
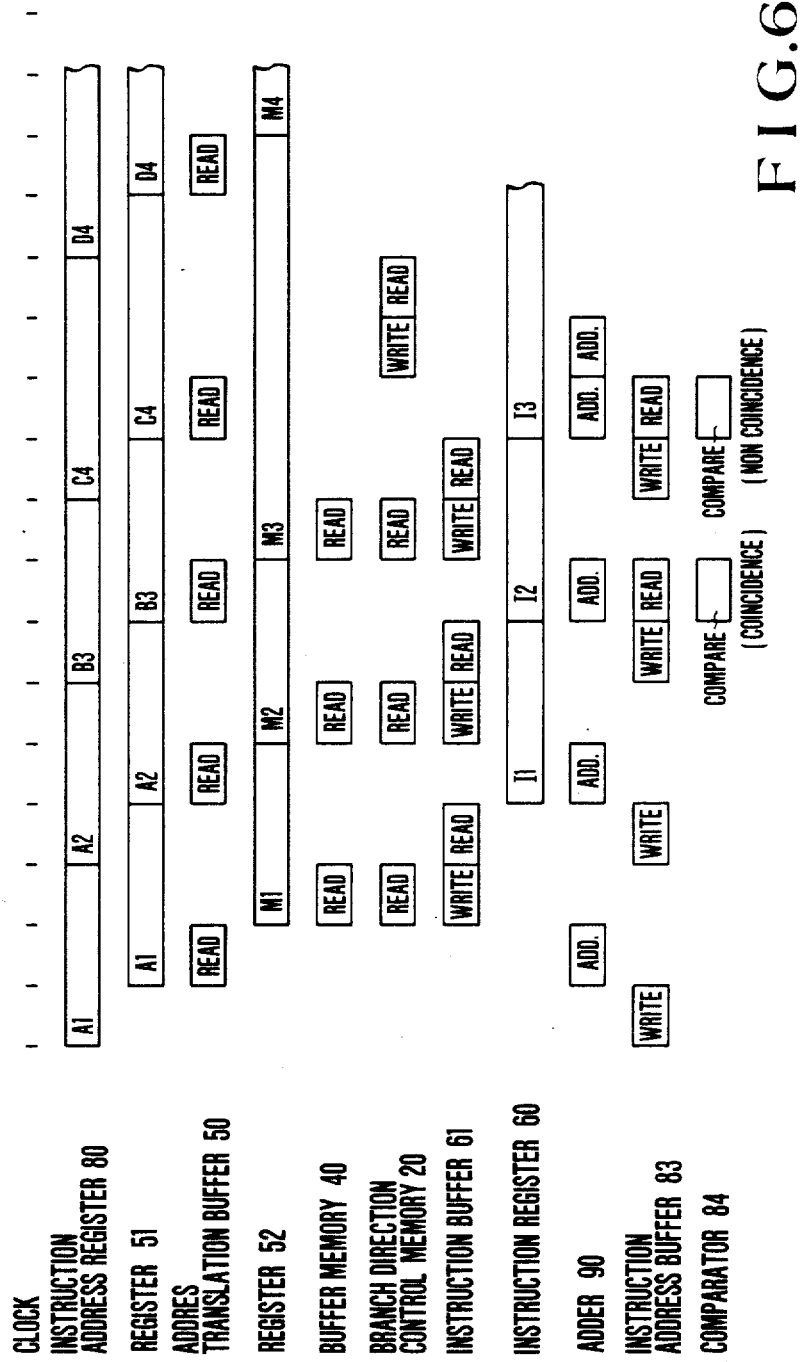
FIG. 6 is a timing chart useful to explain the operation of the second embodiment shown in FIG. 5.
Figure 7:
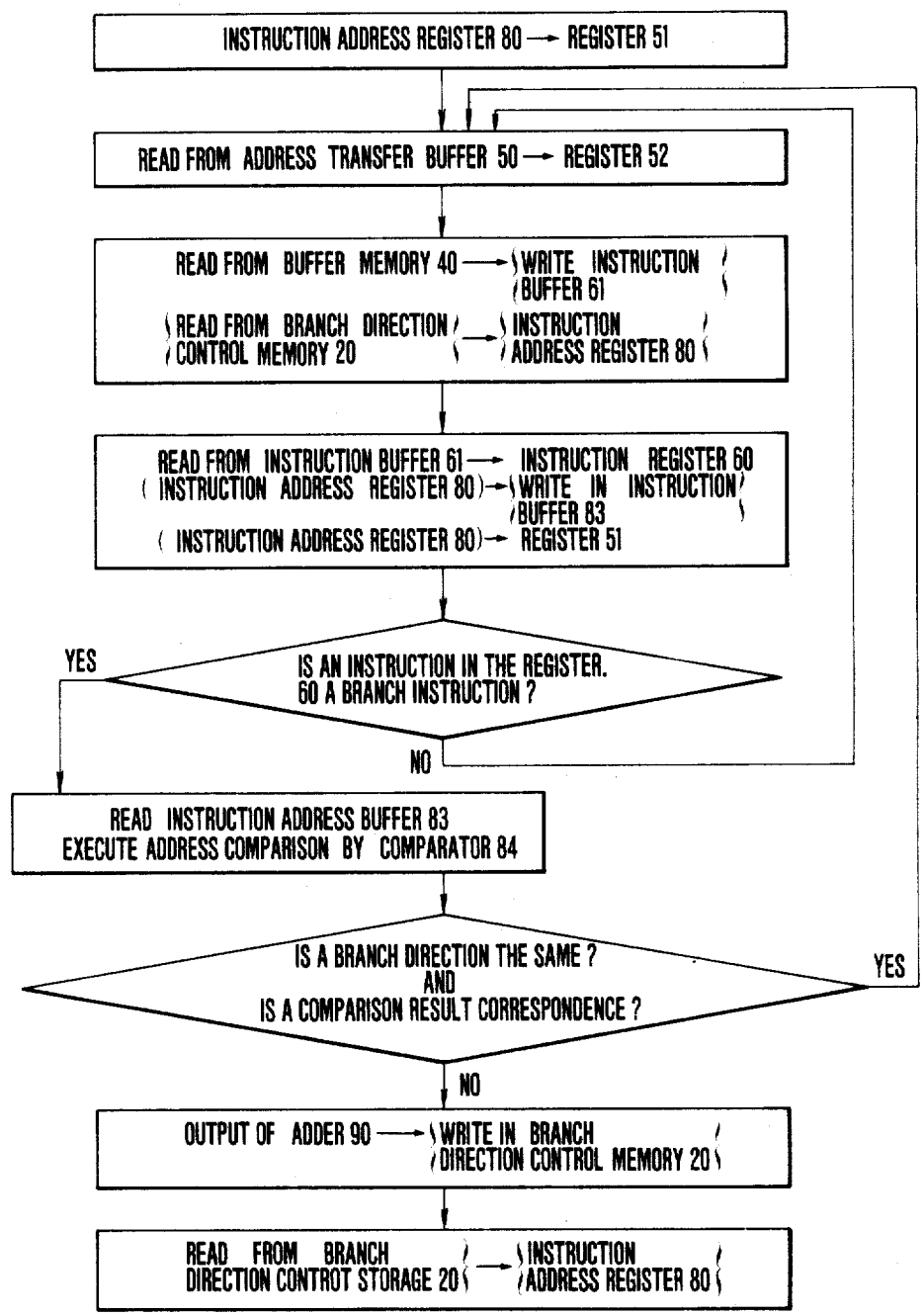
FIG. 7 is a flow chart for explaining the operation of the preceding controller 10 shown in FIG. 5.

Referring now to FIGS. 5, 6 and 7, for the purpose of prefetching an instruction, the content A1 of the instruction address register 80 is applied to the address translation 50 via register 51. In response to the designation of this logic address signal A1, a real address M1 is read out from the buffer 50 and stored in register 52. In accordance with the real address M1 from the register 52, an instruction word I1 is read out from the buffer memory device 40 and then stored in the instruction buffer 61 via the selector 41. At the same time, in response to the designation of the real address M1 from the register 52, a branch direction information (instruction address) A2 is read out from the branch direction control memory device 20 and stored in the register 80 via the selector 81. Then, the content I1 of the instruction buffer 61 is read out and stored in the instruction register 60. This instruction I1 is sent to the preceding controller 10 together with a signal from the arithmetic operation controller 1 to be checked as to whether it is a branch instruction or not. Since the instruction I1 is not a branch instruction, the preceding controller 10 controls various circutries to operate as follows. More particularly, the content A2 of the instruction address register 80 is applied to the address translation 50 via the register 51. In response to the designation of this logic address A2, a real address M2 is read out from the buffer 50 and stored in the register 52, and in response to the designation of the real address M2 from the register 52, an instruction word I2 is read out from the buffer memory device 40 and then stored in the instruction buffer 61 via the selector 41. Concurrently therewith, in response to the designation of the real address M2 from the register 52, a branch direction information (instruction address) B3 is read out from the branch direction control memory device 20 and stored in the register 80 via the selector 81. Thereafter, the contents B3 of the register 80 is stored in the instruction address buffer 83, and the content I2 of the instruction buffer 61 is read out and stored in the instruction register 60. This instruction I2 is sent to the preceding controller 10 together with a signal from the arithmetic operation controller 1 to be checked as to whether it is a branch instruction or not. Since the instruction I2 is an branch instruction, the preceding controller 10 controls various circuitries to operate as follows. Firstly, a displacement from the register 60, and contents respectively read out from of the base register device 91 and the general register device 92 are added together by adder 90. The result of addition, that is an address to which the branching is to be made is compared with a predicted address to which the branching is to be made, the address being read out from the instruction address buffer 83, and the result of comparison is applied to the preceding controller 10. In response to an operand code applied from the register 60 over line 61, at the arithmetic operation controller 1, a check is made as to whether the branching is successful or not. The result of check is applied to the preceding controller 10 from the arithmetic operation controller 1 over line 1003. When the preceding controller 10 judges that the compared signals coincide with each other and that the checked direction is the same as the predicted direction, it is determined that the predicted branch direction was correct. Concurrently with this judging, an address signal B3 is given to the address translation buffer 50 from the register 80 through the register 51. In the buffer 50, the address logic B3 is translated into a real address M3, and the real address M3 is stored in the register 52 based on the result of judgement. According to the designation of the real address M3, an instruction I3 is read out from the buffer memory device 40 and stored in the instruction buffer memory device 61 via the selector 41. In response to the designation of the real address M3 from the register 52, an address C4 to which the branching is to be made is read out from the branch direction control memory device 20 and is then stored in the instruction address register 80 via selectors 21 and 81. The content C4 of the register 80 is stored in the instruction address buffer 53. On the other hand, the instruction I3 from the instruction buffer 61 is set in the instruction register 60. This instruction I3 is sent to the preceding controller 10 together with a signal from the arithmetic operation controller 1 to be checked whether there is an branch instruction or not. Since the instruction I3 is a branch instruction, the preceding controller 10 controls various circuitries to operate as follows. At first, a displacement from the register 60 and contents respectively read out from the base register device 91 and the general register device 92 are added together in the adder 90. The result of addition, that is an address to which the branching is to be made is compared with a predicted address B3 to which the branching is to be made, the address B3 being read out from the instruction address buffer 83, and the result of comparison is sent to the preceding controller 10. In response to the operand code supplied from the register 60 to the preceding controller 10 over line 601, the arithmetic operation controller 1 checks whether the branching is successful or not. The result of this check is supplied to the preceding controller 10 from the arithmetic operation controller 1 over line 1003. When the preceding controller 10 judges that the result of comparison is a noncoincidence, or the result of the check shows that the direction is different from the predicted direction, it is judged that the predicted branching was not correct. At the same time, an address signal C4 is sent to the address translation buffer 50 via the register 51. At the time of the instruction I3, the result of comparison shows a noncoincidence. This shows that the predicted branching was not correct so that the signal transferred by the address translation buffer 50 would not be stored in the register 52. Accordingly, the content M3 of the register 52 is applied at the branch direction control memory device 20 as an address signal to store therein the result of addition D4 supplied thereto from the adder 90 over line 901. This addition operation is performed in the same manner as the addition operation described above. Then, the content D4 of the branch control memory device 20 which has been stored immediately before is read out and stored in the instruction address register 80 via selectors 21 and 81. Thereafter, the succeeding prefetching operation is executed.

As above described, by storing an address to which the branching is to be made together with a branch direction, prefetching is possible without predecoding a prefetched instruction and without address calculation so that even when it is necessary to prefetch at a high speed it is not necessary to provide in duplicate an address adder, and it is not necessary to wait until the contents of a general purpose register GR and a register BR are determined which are necessary when calculating addresses. Although the invention has been described in terms of preferred embodiments, it should be understood that the invention is not limited to these specific embodiments and that many changes and modifications will be obvious to one skilled in the art without departing from the true spirit and scope of the invention as defined in the appended claims.

What is claimed is:

1. A data processing systems having a branch instruction prefetching performance, said system comprising:
    main memory means (5) for storing information;
    buffer memory means (30, 40; 130, 140) coupled to said main memory means having a plurality of blocks for holding a copy of a portion of the information stored in said memory means (5) in said plurality of blocks;
    arithmetic operation control means (1) for executing instructions including a branch instruction;
    branch direction control memory means (2) coupled to said main memory means including at least one block corresponding to at least one of said blocks of said buffer memory means for storing a branch direction information obtained by execution of said branch instruction in a block in said branch direction control memory means corresponding to the block containing said branch instruction of said buffer memory means; and
    preceding control means (10) coupled to said branch direction control memory means and said buffer memory means including means for reading out from said branch direction control memory means said branch direction information and for reading out from said buffer memory means an instruction to be prefetched wherein a common directory means (30) is used for said branch direction control memory means and for said buffer memory means, means for predicting whether a branching will be successful or not based on the branch direction information stored in said branch direction control memory means when said instruction to be prefetched is a branch instruction, and means responsive to a result of said prediction for prefetching an instruction in a direction having a highest probability of being executed after said branch instruction has been executed.

2. The data processing system according to claim 1 wherein said buffer memory means and said branch direction control memory means respectively store data and address information.

3. The data processing system according to claim 1 which further comprises an instruction register coupled to said preceding controller means for storing instructions, and calculating means coupled to said instruction register for calculating a real address by using the instruction data stored in said instruction register under control of said preceding control means.

4. The data processing system according to claim 1 which further comprises an instruction buffer memory means coupled to said buffer memory means which temporarily stores an instruction read out from said buffer memory means.

5. The data processing system according to claim 1 wherein said buffer memory means comprises first and second buffer memory means, said first buffer memory means being used for storing an instruction and said second buffer memory means being used for storing an operand.

6. The data processing system according to claim 2 which further comprises branch instruction buffer memory means which stores a branch instruction address signal formed in relation to an output of said branch direction control memory means and comparator means for comparing an output of said arithmetic operation control means with the output of said branch instruction buffer memory means for producing a signal controlling said preceding control means.

7. A data processing sytem having a branch instruction prefetching performance, said system comprising:
  main memory means (5) for storing information;
  buffer memory means (30, 40, 130, 140) coupled to said main memory means having a plurality of blocks for holding a copy of a portion of the information stored in said main memory means (5) in said plurality of blocks;
  arithmetic operation control means (1) for executing instructions including a branch instruction;
  branch direction control memory means (20) coupled to said main memory means including at least one block corresponding to at least one of said blocks of said buffer memory means for storing a branch direction information obtained by execution of said branch instruction in a block in said branch direction control memory means corresponding to the block containing said branch instruction of said buffer memory means;
  preceding control means (10) coupled to said branch direction control memory means and said buffer memory means including means using a common directory (30) for reading out from said branch direction control memory means said branch direction information and for reading out from said buffer memory means an instruction to be prefetched, wherein said buffer memory means and said branch direction control memory means respectively store data and address information;
  means for predicting whether a branching will be successful or not based on the branch direction control memory means when said instruction to be prefetched is a branch instruction, and means responsive to a result of said prediction for prefetching an instruction in a direction having a highest probability of being executed after said branch instruction has been executed.

* * * * *